March 18, 1941.  A. WEISS ET AL  2,235,412
MEANS FOR CONTROLLING THE BRAKES OF A MOTOR VEHICLE
Filed July 18, 1939  2 Sheets-Sheet 1
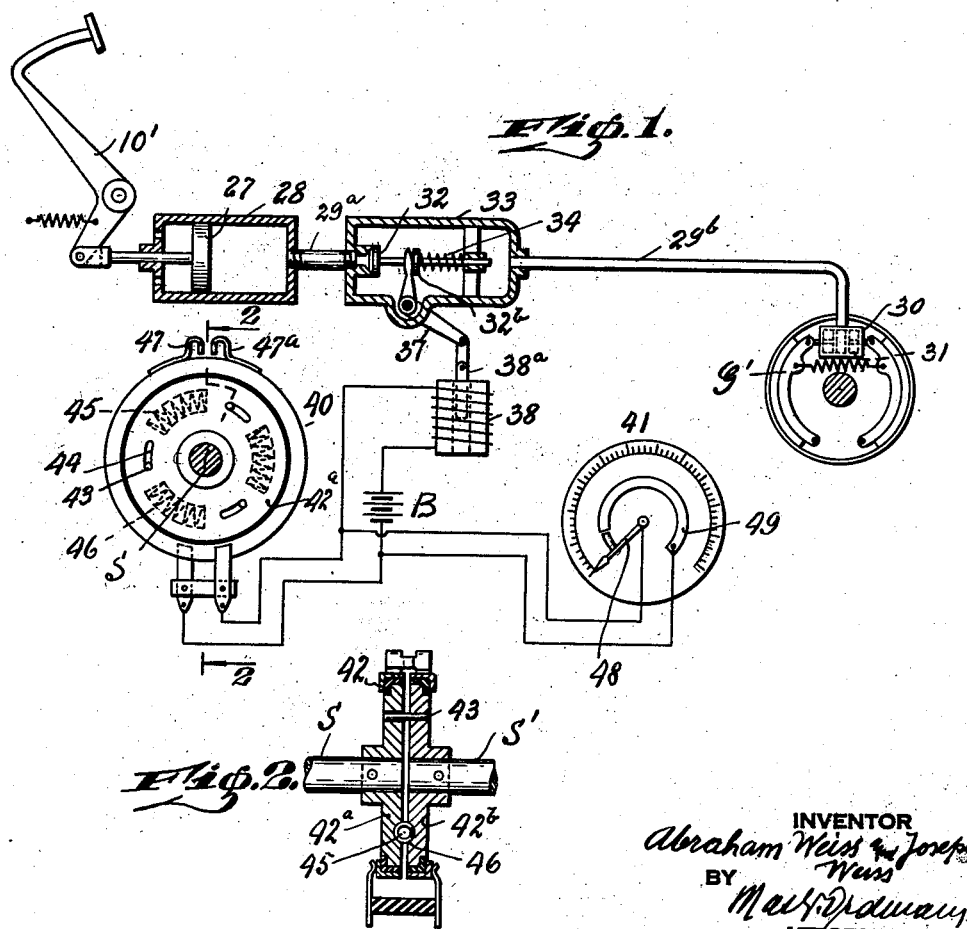

March 18, 1941.  A. WEISS ET AL  2,235,412
MEANS FOR CONTROLLING THE BRAKES OF A MOTOR VEHICLE
Filed July 18, 1939   2 Sheets-Sheet 2
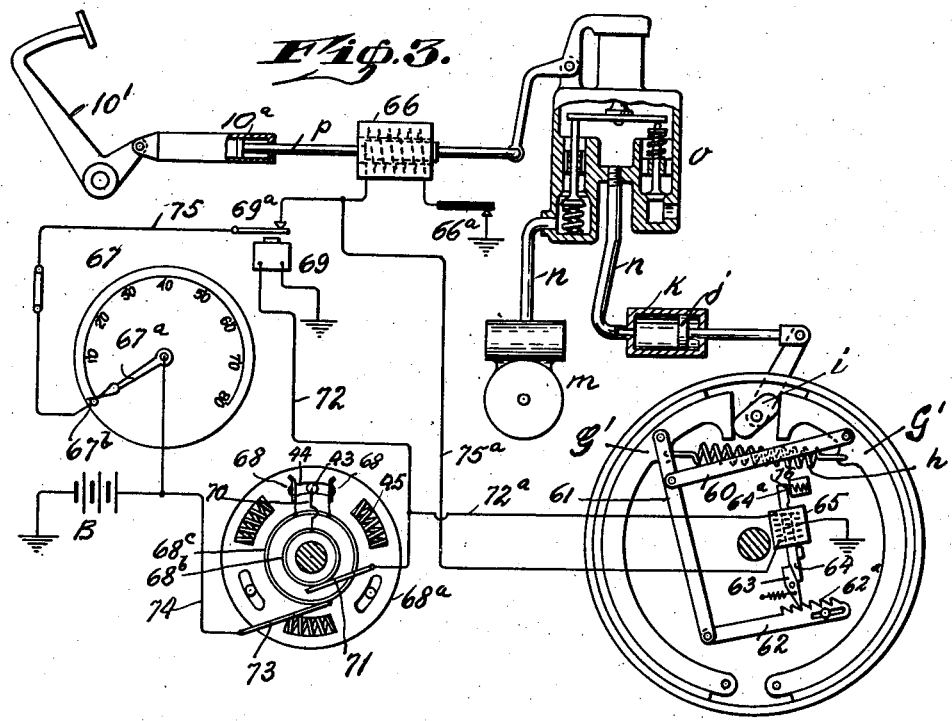
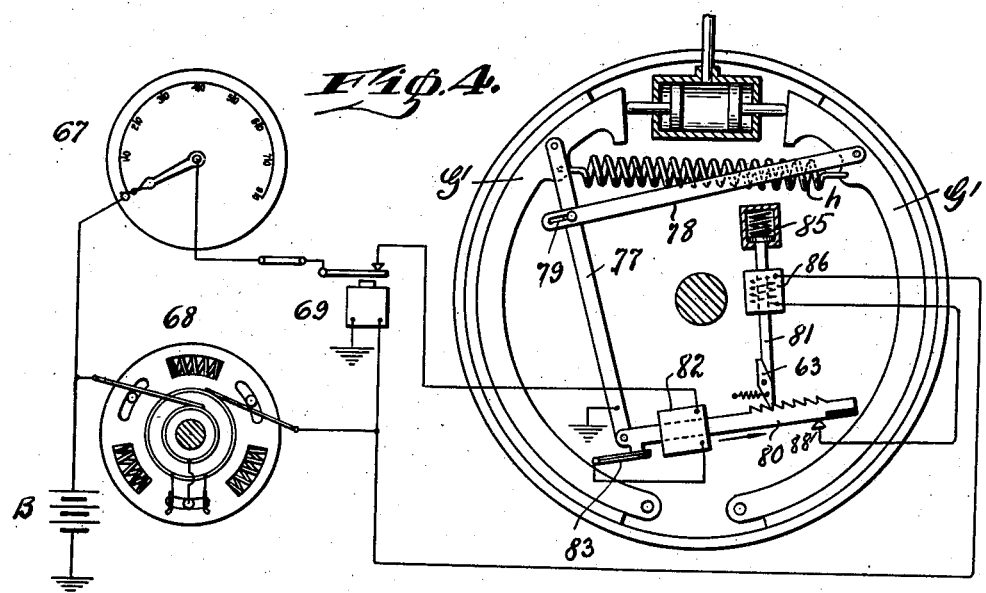
INVENTOR
Abraham Weiss and Joseph Weiss
BY
Martin Urdeman
ATTORNEY Patented Mar. 18, 1941

2,235,412

UNITED STATES PATENT OFFICE 2,235,412

MEANS FOR CONTROLLING THE BRAKES OF A MOTOR VEHICLE

Abraham Weiss and Joseph Weiss, New York, N. Y.; said Abraham Weiss assignor to Joseph Weiss Application July 18, 1939, Serial No. 285,046

17 Claims. (Cl. 192—3)

This invention relates to motor vehicles and more particularly to means for controlling mechanical, hydraulic or other automatic brakes.

With the hitherto used brakes there is the drawback that, when the vehicle happens to stop on a slope, as soon as the foot is taken off the brake pedal the vehicle will have the tendency to roll forward or backward, as the case may be, often causing serious accidents.

The principal object of this invention is to provide means whereby the tendency of the vehicle to roll back upon the release of the brakes will be prevented.

Another object is to provide means whereby the brakes will be automatically locked in braking action, when the vehicle is stopped and the brake pedal depressed.

A still further object is to provide means whereby the brakes will be automatically released by the motion of any of the means for starting the vehicle.

A still further object of this invention is to provide means for preventing the locking of the brakes while the vehicle is in motion.

With these and other objects in view my invention substantially consists in the novel brake control means and the construction, arrangement and combination of the parts thereof, as will be hereinafter more fully described and defined in the appended claims.

In the accompanying drawings which form part of this specification and in which similar reference characters denote corresponding parts, Figure 1 is a more or less diagrammatic view of one embodiment of our invention showing fluid pressure brakes with an automatic control of the locking means therefor, and Figure 2 is a section on line 2—2 of Figure 1 of an electric switch shown in Fig. 1.

Figures 3 and 4 show diagrammatic views of two modifications.

Referring now to the drawings more in detail $a$ denotes the motor, $b$ the intake manifold, $c$ an auxiliary vacuum tank; $d$ a check valve for said tank capable of being manually controlled from the dashboard of the vehicle through a push rod $e$. F denotes one of vehicle wheels and G denotes the brake shoes.

According to our invention the brakes are to be locked in locking position automatically on the depression of the brake pedal and on release of the accelerator or when the vehicle comes to a full stop and are to be unlocked when, to set the vehicle in motion, any part of the means used for setting the vehicle in motion is operated.

In the modification of Figs. 1 and 2 fluid pressure actuated brakes G' are shown. Here the brake pedal 10' is operatively connected to a plunger 27 working in a fluid compressor 28 which through tubes 29ª, 29ᵇ is connected to the fluid pressure cylinder 30 containing plungers 31 actuating the brake shoes G'. The tube 29ª terminates with a valve 32 into a casing 33 and the tube 29ᵇ leads from the latter to the fluid pressure cylinder 30 of the brakes. The valve 32 has a stem 32ª and is actuated by a spring 34 tending to normally hold said valve on its seat. Straddling the valve stem 32ª is one arm of a bell crank lever 37 the other arm of which is connected to the armature 38ª of a solenoid 38. This solenoid is energized from an electric source B whose circuit is controlled by two switches 40 and 41. The switch 40 is adapted to be automatically actuated by some of the means for setting the vehicle in motion while the switch 41 is adapted to be actuated by any moving part of the vehicle.

In the present example the switch 40 is operated as follows: The driving and driven parts S, S' of the vehicle may be coupled together by a torque coupling 42 which may be of well known construction. The same usually comprises two discs 42ª, 42ᵇ, one fixed to the driving part S and the other fixed to the driven part S'. The two discs are yieldably connected to one another by bolts 43 passing through arcuate slots 44 and by coil springs 45 borne in grooves or cavities 46 provided in the opposite faces of the adjacent discs. These coils have the tendency to normally hold the two discs of the driving and driven parts in alignment with one another. Applied to each of these discs and properly insulated from each other are contact members 47, 47ª which constitute the electric switch 40.

It will be clear that when setting the vehicle in motion the driving part S will first begin to revolve and after a small fraction of rotation through torque action exerted by the coils between the two discs transmit its rotation to the driven part S'. By the relative displacement of the two discs the contacts switch 47, 47ª will be brought into contact, closing the switch 40, thereby causing the solenoid 38 to be energized. As a result thereof the bell crank lever 37 will be turned to unseat the valve 32, thereby unlocking the brakes.

Since, however, the closing of the torque actuated switch 40 will open as soon as the two discs return to normal and it is desired to retain the valve open while the vehicle is moving, we are using the second switch 41. This switch 41 may be a device constructed on the principle of a speedometer, that is, in which one contact piece 48 is adapted to close by moving from a zero or insulated position onto a stationary contact piece 49 and stay there while the vehicle is in motion, and as soon as the vehicle stops to move back to its zero position opening the switch.

Thus as long as the vehicle is moving the switch 41 will remain closed and through the bell crank lever hold the valve 32 off its seat and the brakes unlocked. When the vehicle is stopped by the complete depression of the brake pedal 10', because of lack of gas or for other causes the switch 41 will open with the result heretofore described.

In the modification of Fig. 3 a pneumatic brake mechanism is shown which may comprise brake shoes G', a spring $h$ tending to normally release the shoes, a cam $i$ for positively applying the brakes and operated through a plunger $j$ provided in a cylinder $k$ which communicates with a fluid compressor $m$ through conduit $n$ controlled from a well known brake valve $o$ actuated from the brake pedal 10' by rod $p$. The following means may be provided for the automatic application of the brakes and the locking and unlocking thereof.

Pivoted to the brake shoes G' and to one another are levers 60, 61 and a member 62 provided with a set of ratchet teeth 62$^a$ so that the levers when swung in one direction will apply the brake shoes and when swung in the opposite direction release the brake shoes. Engaging the ratchet teeth 62$^a$ of the bar 62 is a spring tensioned pawl 63 which is fulcrumed to a stationary part of the brake mechanism and which can be locked in engagement with said teeth by a suitably guided locking bar 64. This locking bar is adapted to be actuated either from two separate solenoids or a double solenoid 65, which when energized by a circuit running in one direction will cause the locking bar 64 to move into the path of said pawl and lock the latter and consequently the brakes in braking condition, and when energized by the circuit running in the opposite direction will cause the locking bar 64 to move in the reverse direction unlocking the pawl 63 and the brake shoes G'.

The brake pedal 10' is slidably connected to rod $p$ and the latter is operatively connected to or formed integral with the armature of a solenoid 66. This solenoid 66 is adapted to be energized from the same circuit which energizes the solenoid 65 to move the locking bar into locking position and which circuit is controlled from a switch 67 adapted to be actuated from a driven part of the vehicle. This switch may be similar to switch 41 of modification shown in Figs. 1 and 2, except that switch 67 is adapted to be closed when the movable contact piece 67$^a$ is in its zero or initial position, that is when the vehicle comes to a full stop.

One terminal of the solenoid 66 may have a bimetallic ground connection 66$^a$ to automatically open the circuit through the solenoid 66 immediately after the latter caused said brake valve $o$ to open. There is a second switch 68 adapted to be actuated by the means for setting the vehicle into motion, as for instance a torque actuated coupling 68$^a$, between driving and driven parts of the vehicle, similar to switch 40 shown in Figs. 1 and 2, to close the circuit through the solenoid 65 so as to move the locking bar out of its locking position and release the brakes.

In this switch one of the bolts 43 forms one contact piece while at each end of the corresponding slot 44 another contact piece is provided. The bolt is electrically connected as at 70 to one of the movable parts 68$^b$ of the coupling 68$^a$ which through brush 71 and wire 72 leads to one terminal of an auxiliary solenoid 69, the other terminal of which is grounded. The other movable part 68$^c$ of the coupling 68$^a$ is connected by brush 73 and wire 74 to the movable contact 67$^a$ of switch 67 and to one pole of the battery B. Suitable insulations (not shown) are provided between the movable parts 66$^b$ and 66$^c$ of the coupling 68$^a$.

The stationary contact piece 67$^b$ of the switch 67 is connected by wire 75 through said cut out 69$^a$ to one terminal of the solenoid 66. Brush 71 is also connected by wire 72$^a$ and wire 75 is connected by wire 75$^a$ to the solenoid 65.

The auxiliary solenoid actuates a cut out switch 69$^a$ which may be used as a safety switch to make sure that at the instant the torque actuated switch 68 is closed the locking circuit through the solenoid 65 is broken and the locking bar is released.

The operation of the automatic brake control and locking means is as follows:

When the vehicle is brought to a full stop which may occur either through the manual operation of the brakes, lack of gas, obstruction on the road or for any other cause, and the switch 67 is closed, the brake valve $o$ will be operated, through the solenoid 66. The levers 60, 61 will be swung into brake applying position against the tension of the shoe spring $h$, and the ratchet bar 62 will be moved into locking position. At the same time the solenoid 65 will be energized by a circuit flowing in a direction to move the locking bar 64 into the path of the pawl 63 which locks the ratchet bar in locking position.

When the vehicle is to be set in motion the operation of the driving element of the vehicle will, in the manner described in connection with the modification shown in Fig. 5, bring about a closure of the torque actuated switch 68, causing the solenoid 65 to be energized in the reverse direction and thereby move the locking bar out of its locking position, permitting the bar 62, under the tension of spring $h$, to return to initial position and the levers 60, 61 to unlock the brake shoes.

The locking bar 64 may be suitably held in its adjusted position by a detent member 76 capable of engaging a notch 64$^a$ in said bar.

While in unlocking position the locking bar 64 will not interfere with the ordinary operation of the brake shoes during the motion of the vehicle, permitting the levers 60, 61 to swing to and fro and bar 62 to reciprocate.

The mechanism hereinbefore described is advantageous, in that the same may be readily built in the brake body to constitute a compact unit therewith.

In the modification shown in Fig. 4 which by way of an example, shows a hydraulic brake mechanism, the levers 77, 78 pivoted to the brake shoes G' and to the toothed bar 80 are slidably interconnected with one another as at 79, so as not to interfere with the ordinary manual or hydraulic operation of the brakes. When, however, the toothed bar 80 will be moved into locking position, by the means hereinafter described, these levers 77, 78 will move the brake shoes into braking position.

This we accomplish by the following device:

A solenoid 82 associated with bar 80 is energized by a circuit controlled through switch 67 which is actuated from a driven part of the vehicle and which at the instant the vehicle comes to a full stop will close the circuit through said solenoid. One terminal of said solenoid may have a bimetallic ground connection 83 so as to momentarily open the circuit through said solenoid when the bar 80 is moved into locking position. The locking bar 81 cooperating with pawl 63 to lock the bar 80 in locking position under the tension of a return spring 85 is also associated with a solenoid 86 which is energized from a circuit controlled by the torque switch 68 identical with that shown in Fig. 7. One terminal of said solenoid is connected to circuit make and break elements 88 of which bar 80 may be one. In other respects the construction is similar to that shown in Fig. 3.

The operation is as follows:

During the motion of the vehicle the bar 80 will be unlocked and the brakes may be manipulated manually in the usual way, the switches 67 and 68 remaining open.

When the vehicle comes to a full stop the electric circuit through solenoid 82 will be closed through the switch 67 causing the bar 80 to move into locking position, thereby also swinging levers 77 and 78 into brake applying position. In this position bar 80 will be held by the locking bar 81 normally projected into the path of the pawl 63.

When the vehicle is to proceed and its driving part is set into motion the torque coupling 68ª will close switch 68 causing the electric circuit to energize solenoid 86, as a result of which the locking bar 81 against the tension of its spring 85 will move out of the path of pawl 63, releasing thereby bar 80 which together with levers 77, 78, under tension of spring h, will return into initial brake releasing position.

The safety cut out 69 may be here also used to insure that at the instant the switch 68 is closed for the release of the brakes the switch 67 is opened.

Various other modifications may be made without departing from the principle of our invention. We, therefore, do not wish to limit ourselves to any details of construction herein described and shown.

What we claim is:

1. In a motor vehicle having brake mechanism, means for actuating said mechanism, including means controlled by the motion of the vehicle and adapted to automatically apply and lock the same in braking position when the vehicle comes to a full stop, and means adapted to automatically unlock and release said brakes when a driving part of the vehicle is set into motion.

2. In a motor vehicle according to claim 1 in which the automatic brake locking means include levers operatively connected to said brake mechanism, locking elements cooperating with said levers and electric means for actuating said locking elements, said electric means including a switch adapted to be automatically closed when the vehicle comes to a full stop, and to cause said levers to move into and become locked in locking position and a second switch adapted, when the driving part of the vehicle is set into motion, to be automatically closed by the initial displacement between driving and driven parts of the vehicle and to unlock and release said levers.

3. In a motor vehicle according to claim 1 in which the automatic brake locking means include levers and locking elements cooperating therewith and so operatively connected to said brake mechanism as not to be affected by the ordinary operation of said brake mechanism while the vehicle is in motion.

4. In a motor vehicle having brakes, means for manually actuating said brakes, and electrically controlled means for automatically actuating said brakes, including means for applying said brakes, means for locking the brakes in braking position when the vehicle comes to a full stop, means for automatically unlocking said locking means and for automatically releasing said brake applying means when the driving part of the vehicle is set into motion.

5. In a motor vehicle according to claim 4 in which said electric means include an electromagnetic means operatively connected to said manual brake actuating means and electro-magnetic means operatively connected to said means for locking said brakes.

6. In a motor vehicle the combination with pneumatically operated brakes including a brake valve, and means for setting the vehicle in motion, of electro-magnetic means for automatically controlling said valve, brake actuating means operatively connected to the brake shoes, locking means cooperating therewith, electro-magnetic means for actuating said locking means and electric switches for controlling said electro-magnetic means so as to automatically apply and lock said brakes when the vehicle comes to a full stop and to unlock and release the same when said means for setting the vehicle in motion are operated.

7. In a motor vehicle, according to claim 1 in which levers are operatively connected to the shoes and supported on a stationary part of said brake mechanism and a locking element cooperating with said levers, said levers and locking element constituting a unit with the brake mechanism.

8. In a motor vehicle having brakes, means for actuating said brakes, means for setting the vehicle in motion including a medium affected by the transmission of motion from the driving to a driven part of the vehicle, means so associated with said brake actuating means as to automatically cause the locking of said brakes when said vehicle comes to a full stop and means controlled by said medium and so associated with said locking means as to automatically release said brakes at the instant said driving part of the vehicle is set in motion.

9. In a motor vehicle the combination with the driving and driven parts, motion transmitting means, brakes and means for actuating said brakes, of electric means for controlling said brake actuating means, said electric means including an electric circuit and two electric switches, one of which is affected by said motion transmitting means so as to automatically cause the unlocking of said brakes when the driving part of the vehicle is set into motion and the other electric switch is affected by the motion of the vehicle so as to automatically cause the locking of said brakes in braking position when said vehicle comes to a full stop.

10. In a motor vehicle the combination with the driving and driven parts of the vehicle, motion transmitting means between said driving and driven parts including a torque coupling, brakes and means for manually actuating the same, of electric means for automatically controlling said brake actuating means including an electric circuit, a torque-responsive switch in said circuit adapted to automatically cause the unlocking of said brakes when the driving part of said vehicle is set into motion and another switch in said circuit adapted to be effected by the motion of the vehicle to automatically cause the locking of said brakes in locking position at the instant the vehicle comes to a full stop.

11. In a motor vehicle, the combination with the driving and driven parts of the vehicle, motion transmitting means between said driving and driven parts including a torque coupling and brakes, of electric means for automatically actuating said brakes including an electric circuit, a torque-responsive switch in said circuit adapted to automatically cause the unlocking and moving of said brakes into unbraking position when the driving part of said vehicle is set into motion and another switch in said circuit actuated by the movement of the vehicle and adapted to automatically cause the brakes to be applied and locked in applied position at the instant the vehicle comes to a full stop.

12. In a motor vehicle having driving and driven parts, motion transmitting means between said driving and driven parts, brakes, means actuated by the movement of the vehicle and adapted to automatically apply and lock said brakes when the vehicle comes to a full stop and means actuated by said motion transmitting means and adapted to automatically unlock and move said brakes into unbraking position when a driving part of the vehicle is set into motion.

13. In a motor vehicle having brake mechanism, means controlled by the motion of the vehicle, means for applying said brakes, means for locking said brakes in braking position, both said last-named means being simultaneously and automatically controlled from said first-named means so as to apply and lock the brakes when the vehicle comes to a full stop and means adapted to automatically unlock and release said brakes when a driving part of the vehicle is set into motion.

14. In a motor vehicle having brake mechanism, electric means controlled by the motion of the vehicle, means for applying the brakes, means for locking said brakes, electric means between said first-named means and said two last-named means to automatically control said two last-named means to simultaneously apply and lock said brakes the instant the vehicle comes to a full stop and means adapted to automatically unlock and release said brakes when a driving part of the vehicle is set into motion.

15. In a motor vehicle having brake mechanism, means for setting the vehicle in motion, means controlled by the motion of the vehicle, means for applying the brakes, means for locking said brakes in braking position, said two last-named means being controlled from said second-named means to automatically apply said brakes and lock the same the instant the vehicle comes to a full stop and means adapted to automatically unlock and release said brakes when a driving part of the vehicle is set into motion.

16. In a motor vehicle having brakes, means for setting the vehicle in motion, electrically actuated means for applying the brakes, electrically actuated means for locking the brakes, means actuated by the motion of the vehicle and controlling said two last-named means so as to simultaneously apply the brakes and lock the same in braking position at the instant the vehicle comes to a full stop and means for automatically unlocking and releasing said brakes when a driving part of the vehicle is set into motion.

17. In a motor vehicle having brakes, means for setting the vehicle in motion including a medium affected by the transmission of motion from the driving to a driven part of the vehicle, means for automatically applying the brakes, means for automatically locking the brakes, means actuated by the motion of the vehicle and adapted to control said two last-named means so as to apply and lock the brakes the instant the vehicle comes to a full stop and means controlled by said medium to automatically release said brakes the instant a driving part of the vehicle is set in motion.

ABRAHAM WEISS.
JOSEPH WEISS.